United States Patent
Smith et al.

(10) Patent No.: US 6,406,635 B1
(45) Date of Patent: Jun. 18, 2002

(54) MACHINE TOOL COOLANT SYSTEM INCLUDING A PUMP WITH CHOPPING MECHANISM AT INLET

(75) Inventors: William L. Smith, Cold Spring; Charles D. Brann, Crittenden, both of KY (US)

(73) Assignee: Ruthman Pump and Engineering, Inc., Cincinnati, OH (US)

( * ) Notice: Subject to any disclaimer, the term of this patent is extended or adjusted under 35 U.S.C. 154(b) by 17 days.

(21) Appl. No.: 09/906,978

(22) Filed: Jul. 17, 2001

(51) Int. Cl.[7] .......................... F01M 1/10; B01D 35/00
(52) U.S. Cl. ..................... 210/805; 210/168; 210/173; 210/258; 210/416.5; 184/6.24; 415/121.1
(58) Field of Search .................... 210/767, 805, 210/167, 168, 173, 258, 416.5, 252; 184/6.24; 415/121.1

(56) References Cited

U.S. PATENT DOCUMENTS

| | | | |
|---|---|---|---|
| 2,276,824 A | * 3/1942 | Carruthers | |
| 2,371,681 A | 3/1945 | Durdin | 103/111 |
| 3,325,107 A | 6/1967 | Peterson | 241/101 |
| 3,375,776 A | * 4/1968 | Dyson | |
| 3,653,807 A | * 4/1972 | Platt | |
| 3,788,762 A | 1/1974 | Partos | 415/74 |
| 3,961,758 A | * 6/1976 | Morgan | |
| 3,973,866 A | 8/1976 | Vaughan | 415/121 B |
| 4,378,093 A | 3/1983 | Keener | 241/46 B |
| 4,650,342 A | 3/1987 | Goodwin | 366/264 |
| 4,728,256 A | 3/1988 | Araoka | 415/121 G |
| 5,005,364 A | 4/1991 | Nelson | 62/76 |
| 5,030,346 A | 7/1991 | McEwen | 210/258 |
| 5,154,584 A | 10/1992 | McEwen | 417/360 |
| 5,230,793 A | * 7/1993 | Lenhart et al. | |
| 5,246,336 A | 9/1993 | Furukawa | 415/98 |
| 5,279,734 A | 1/1994 | Nehls | 210/295 |
| 5,590,678 A | * 1/1997 | Martinitz | |
| 5,593,596 A | * 1/1997 | Bratten | |
| 6,235,209 B1 | * 5/2001 | Bratten | |

* cited by examiner

Primary Examiner—Duane Smith
Assistant Examiner—Fred Prince
(74) Attorney, Agent, or Firm—Wood, Herron & Evans, LLP

(57) ABSTRACT

A coolant supply and recycle system and method for cleaning used machine tool coolant and returning it to the machine tools for reuse. A tank receives used coolant containing metal chips from one or more machine tools. A pump is in communication with the tank, and is operative to extract used coolant from the tank into an inlet portion of the pump. Within the inlet, the pump includes an inducer-chopper operative to prime the pump and to chop the metal chips to effect a reduction in their size prior to discharging the used coolant from the pump. An impeller is recessed in the pump above the inducer-chopper to create a vortex of the used coolant and sized-reduced metal chips and force them from the pump discharge. The pump discharge portion is connected to a filter for removing the metal chips and supplying the clean coolant back to the machine tools.

16 Claims, 2 Drawing Sheets

MACHINE TOOL COOLANT SYSTEM INCLUDING A PUMP WITH CHOPPING MECHANISM AT INLET

FIELD OF THE INVENTION

This invention relates to coolant supply system including a pump for a filtration system for cleaning used machine tool coolant containing metal chips and recycling clean coolant back to the machine tools for reuse.

BACKGROUND OF THE INVENTION

Conventional coolant pumping systems conventionally include settling tanks located below floor level which are utilized to collect dirty or contaminated coolant, pass it through a filter to a clean coolant compartment of the tank, and then pump the clean re-circulated coolant back to one or more machine tools. For example, McEwen U.S. Pat. No. 5,030,346 is one patent disclosing such a system. In this patent, the settling tank comprises two discrete compartments. One compartment is for receiving dirty coolant from multiple machine tools. A second compartment is for receiving clean coolant from a filter located between the dirty coolant compartment and the clean coolant compartment. From the clean coolant compartment, a convention centrifugal pump is operated to pump the clean filtered coolant back to one or more machine tools. Similar systems are disclosed in McEwen U.S. Pat. No. 5,154,584, Furukawa U.S. Pat. No. 5,246,336, and Nehls U.S. Pat. No. 5,279,734. In each of these patents, the dirty liquid coolant is first filtered before being supplied to a clean coolant compartment and then to a pump, such that dirty coolant never enters the pump inlet.

The dirty coolant contains metal chips or shavings produced by the machine tools during their operation. These chips are often of large size, and can clog or break the filter between the dirty coolant compartment and the clean coolant compartment. There is thus a need to reduce the size of metal chips and shavings prior to the metal pieces being supplied to a filter which, in turn, supplies clean coolant back to the machine tools.

SUMMARY OF THE INVENTION

The present invention provides a coolant supply and recycle system for cleaning used machine tool coolant and returning it to the machine tools for reuse. To this end, and in accordance with the present invention, a system is provided having a vessel or tank for receiving used coolant from one or more machine tools. The used coolant comprises contaminants including metal chips. A pump is provided in communication with the tank, and the pump is operative to withdraw used coolant including the metal chips from the tank into an inlet portion of the pump. Within the inlet, the pump includes an inducer-chopper operative to prime the pump and to chop the metal chips to effect a reduction in size prior to discharging the used coolant and chips from the pump. To accomodate the inducer-chopper, the pump impeller is recessed into an upper portion of the pump volute. The recessed impeller forces the dirty coolant with the size-reduced metal chips to the discharge portion of the pump. The pump discharge portion is connected to a filtration system for removing the sizereduced metal chips and other contaminants and supplying the clean coolant back to the machine tools. In one embodiment of the present invention, the system includes a tank having a substantially conical shaped bottom portion such that the metal chips settle in that bottom portion, and the inducer-chopper withdraws the used coolant from that bottom portion.

The present invention further provides a method for recycling coolant for at least one machine tool. The method includes operating one or more machine tools with a coolant whereby metal chips are contained in the used coolant, and this used coolant is then transferred to a dirty coolant tank. A pump having an inducer-chopper within an inlet portion thereof extracts the used coolant and metal chips into the inlet, and the inducer-chopper chops the metal chips to reduce their size. Thereafter, a recessed impeller forces the used coolant with the size-reduced chips to be discharged from the pump and supplied to a filter for removing the chips and other contaminants from the coolant. This filtered clean coolant is then recycled back to one or more machine tools for reuse.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
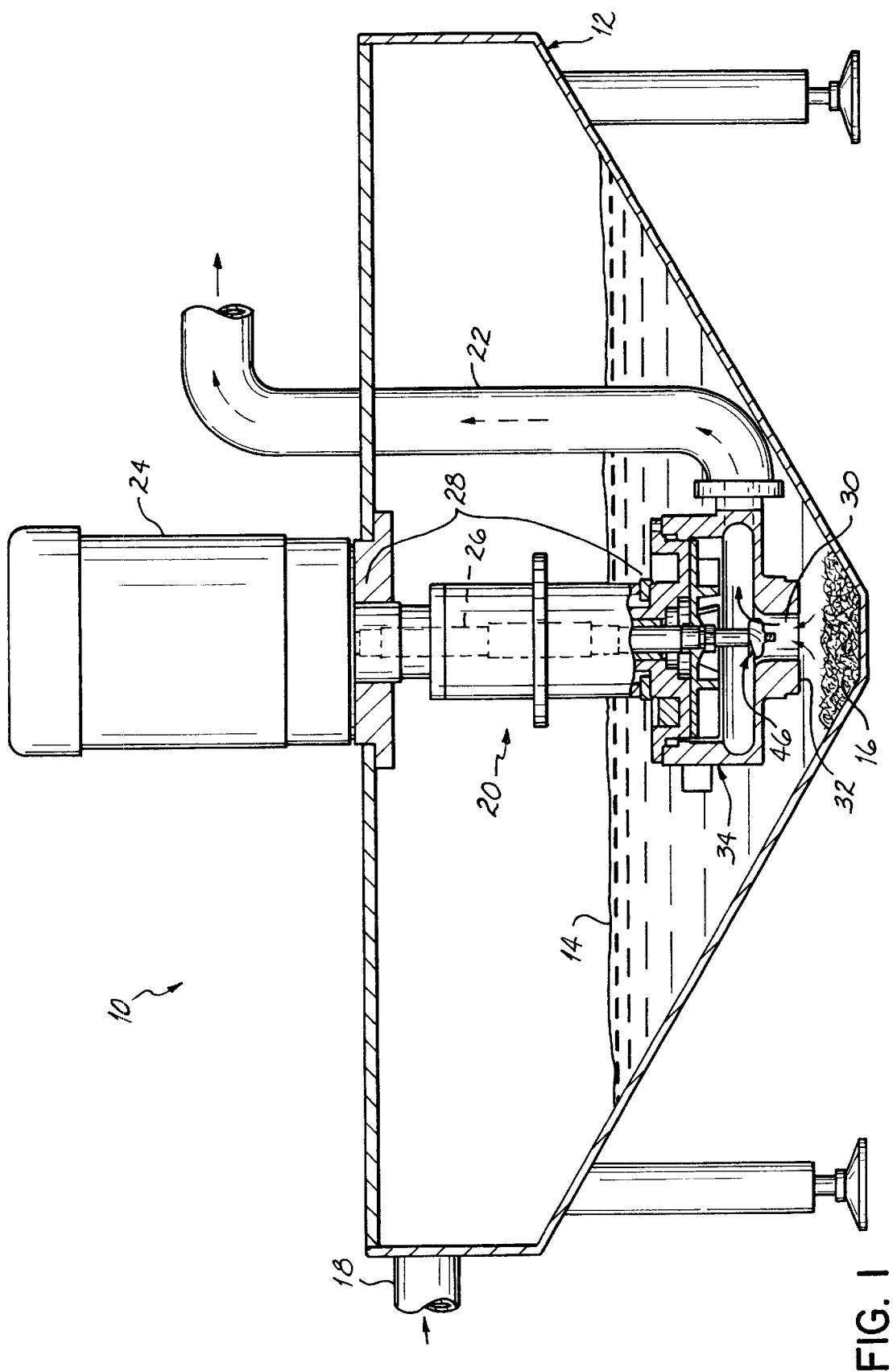
FIG. 1 depicts in partial cross-section a dirty coolant tank containing a pump having an inducer-chopper and recessed impeller in accordance with the present invention.

With reference to the figures, a coolant supply and recycle system 10 is provided for collecting used machine tool coolant, preparing the used coolant for filtering, passing the used coolant through a filter and recirculating the clean filtered coolant back to the machine tools. With specific reference to FIG. 1, a dirty coolant tank 12 is provided for holding used coolant 14, which contains metal chips 16 from the machining operation conducted by one or more machine tools that utilized the coolant. The used coolant 14 enters tank 12 through inlet 18, which is connected to one or more machine tools (not shown). A pump 20 is mounted within tank 12 for extracting used coolant 14 and metal chips 16 from the tank 12. After the used coolant 14 and metal chips 16 are processed by the pump 20, the processed solid-containing liquid is discharged from pump 20 and transported via pipe 22 to a filter (not shown).

Pump 20 is advantageously a semi-submersible, centrifugal pump that includes a sealed motor housing 24 with a motor (not shown) driving a downwardly-directed drive shaft 26. Shaft 26 extends from the motor through a power frame 28 through to an inlet portion 30 at the lower end 32 of pump 20. Power frame 28 may be any conventional pump power frame, which typically includes such components as bearings, seals, bushings, and a slinger for preventing fluid from migrating up the shaft 26. It should be understood that the shaft may, for example, have an integral shaft design as shown in FIG. 1 or a coupled shaft design as shown in FIG. 2.

Figure 2:
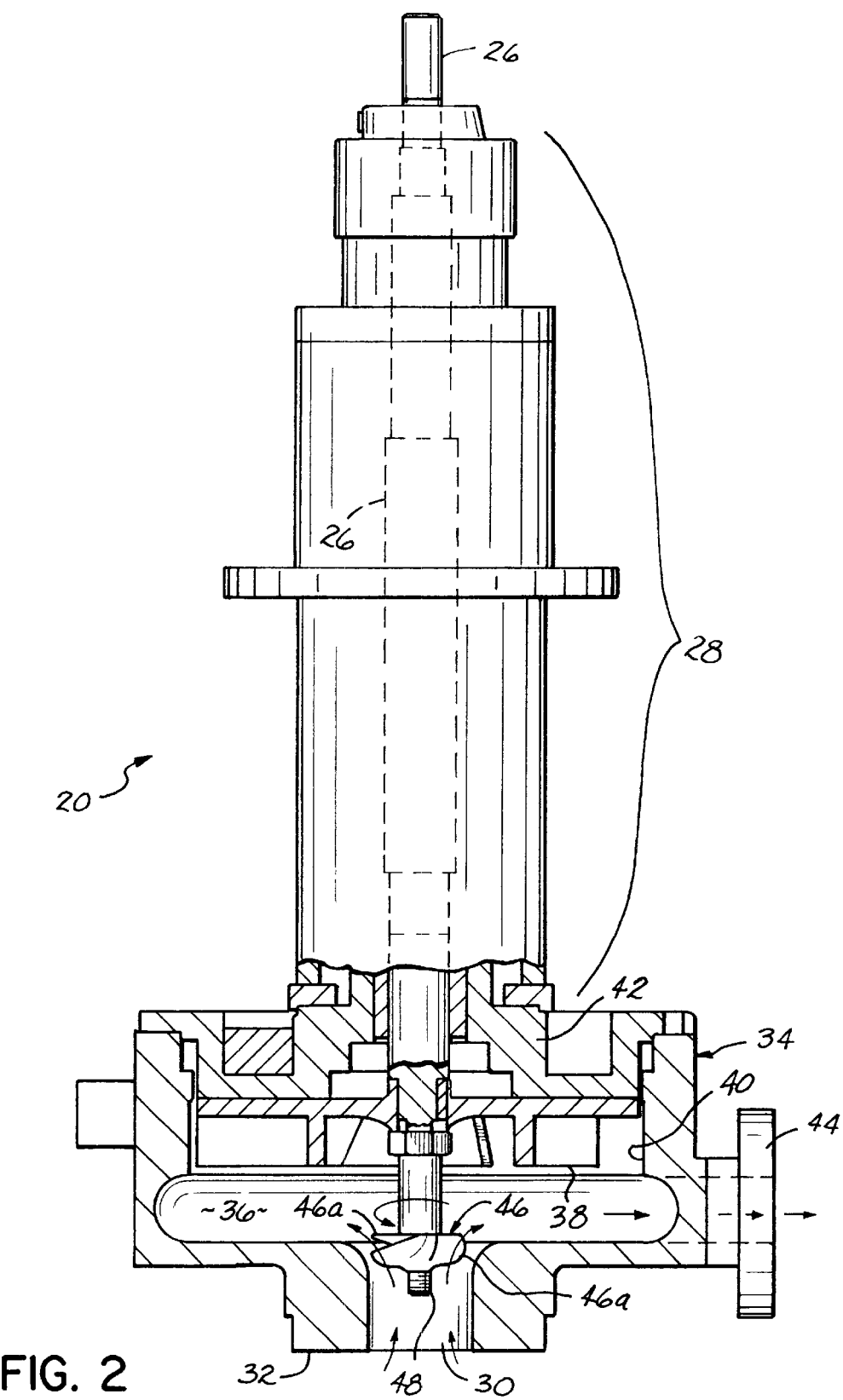
FIG. 2 depicts in partial cross-section a pump having an inducer-chopper and recessed impeller in accordance with the present invention.

With reference to FIG. 2, pump 20 is depicted in an enlarged view with the portion below the power frame 28 in cross-section. This lower portion includes a volute 34, also commonly and interchangeably referred to as the casing or impeller housing. Casing or volute 34 includes inlet portion 30, a circular, concentric volute cavity 36 inward of inlet portion 30, and an impeller 38 recessed into an upper portion 40 of the casing 34 above cavity 36. The upper portion 40 is enclosed above the impeller 38 by stem plate 42. Discharge flange 44 connects the volute 34 to the discharge pipe 22.

In accordance with the present invention, an inducer-chopper 46 is positioned at the end of shaft 26 within the inlet portion 30 of volute 34. Inducer-chopper 46 serves a dual purpose. First, the inducer-chopper 46 functions to induce used coolant 14 with metal chips 16 to enter the inlet portion 30 of pump 20. In other words, the inducer-chopper 46 primes the pump 20 to withdraw used coolant 14 from the tank 12 into the volute 34 of pump 20. The used coolant 14 with metal chips 16 is extracted into the inlet portion 30 and into the volute cavity 36 and upper portion 40 of casing 34. Second, the inducer-chopper 46 functions to reduce the size of metal chips 16 upon being extracted into the inlet portion 30 as the chips 16 are passed into volute cavity 36. It should be understood that the term "metal chips" is meant to include all shapes and sizes of metal solids produced by the machining operation. The inducer-chopper 46 includes a plurality of blades 46a and is driven by drive shaft 26 via the electric motor. Shaft 26 advantageously includes a threaded shaft extension 48 for attaching the inducer-chopper 46 and for replacing the inducer-chopper when the chopping blades 46a become worn.

After passing through the inducer-chopper 46, the used coolant 14 including size-reduced metal chips 16 enters the volute cavity 36 and is spun into a vortex by the recessed impeller 38. Impeller 38 is also driven by drive shaft 26 via the electric motor. Because the impeller 38 and inducer-chopper 46 are both driven by drive shaft 26, they rotate in the same direction, creating a powerful vortex, thereby increasing the efficiency of the pump 20. By virtue of the impeller 38 being recessed into the upper portion 40 of casing 34, the radial load for the pump 20 is reduced, as compared to an impeller positioned within or adjacent to the inlet 30 of the pump 20. Thus, the likelihood of pump failure is reduced. Further, volute cavity 36 is advantageously of circular, concentric dimension thereby eliminating clogs in the volute 34, which can also lead to pump failure. The vortex action created by impeller 38 forces used coolant 14 containing size-reduced metal chips 16 to exit the volute 34 through discharge flange 44 into discharge pipe 22. The discharge pipe 22 then supplies the used coolant 14 and size-reduced metal chips 16 to a filter (not shown) for removing the size-reduced metal chips 16 and other contaminants from the used coolant 14. A clean, filtered coolant may then be recycled back to one or more machine tools for reuse.

Because the inducer-chopper 46 reduces the size of the metal chips 16 within the inlet 30 of the pump 20, clogs in the pump volute 34 and downstream in the filter are prevented, thereby decreasing incidents of failure within the filtration system. Pump and filter failure cause downtime in the coolant supply and recycle system 10, which is responsible for continuously supplying one or more machine tools with coolant necessary for their operation. The inducer-chopper 46 also primes the pump 20 to insure it properly functions upon start-up of the machine tools and the coolant supply and recycle system 10. The recessing of the impeller 38 not only accommodates the inducer-chopper 46, but also reduces radial load in the pump 20, thereby further reducing the likelihood of pump failure and increasing the efficiency of the pump.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A coolant supply and recycle system including a pump for recycling coolant back to at least one machine tool, the system comprising:

a tank for receiving used coolant from at least one machine tool, the used coolant comprising metal chips; and a coolant pump in communication with the tank, the pump operative to extract used coolant from the tank into an inlet and to transfer the used coolant to a filter for removing the metal chips and for returning the filtered coolant to the at least one machine tool;

wherein the pump includes an inducer-chopper within the inlet operative to chop the metal chips to effect a reduction in size of the chips prior to transferring the used coolant to the filter.

2. The system of claim 1, wherein the pump further includes an impeller recessed upward of the inlet for effecting the transfer of the used coolant to the filter.

3. The system of claim 2, wherein the pump further includes a circular, concentric cavity intermediate the inducer-chopper and impeller from which the used coolant may be transferred to the filter.

4. The system of claim 2, further including a motor-driven drive shaft extending through the pump to which the inducer-chopper and impeller are each connected, the drive shaft operative to concurrently rotate both the inducer-chopper and impeller in the same direction.

5. The system of claim 4, wherein the inducer-chopper is removable from the drive shaft.

6. The system of claim 1, wherein the tank includes a substantially conical shaped bottom portion, and the pump with the inducer-chopper is operative to extract the used coolant from the bottom portion.

7. The system of claim 1, wherein the tank includes a truncated conical shaped bottom portion, and the pump with the inducer-chopper is operative to extract the used coolant from the bottom portion.

8. A coolant supply and recycle system including a pump for recycling coolant back to at least one machine tool, the system comprising:

a tank for receiving used coolant from at least one machine tool, the used coolant comprising metal chips; and a coolant pump in communication with the tank and used coolant, the pump comprising:

a) an inducer-chopper within an inlet portion operative to extract the used coolant from the tank into the inlet portion and further operative to chop the metal chips to effect a reduction in size of the chips;

b) a circular, concentric cavity above the inlet portion for receiving the used coolant comprising the size-reduced metal chips;

c) a discharge outlet adjacent the cavity through which the used coolant is transferred to a filter; and d) an impeller above the cavity operative to create a vortex of the used coolant in the cavity to force the used coolant through the discharge outlet to a filter for removing the metal chips and for returning the filtered coolant to the at least one machine tool.

9. The system of claim 8, further including a motor-driven drive shaft extending through the pump to which the inducer-chopper and impeller are each connected, the drive shaft operative to concurrently rotate both the inducer-chopper and impeller in the same direction.

10. The system of claim 9, wherein the drive shaft includes a threaded extension to which the inducer-chopper is attachable and removable from.

11. The system of claim 8, wherein the tank includes a substantially conical shaped bottom portion, and the inducer-chopper is operative to extract the used coolant from the bottom portion.

12. The system of claim 8, wherein the tank includes a truncated conical shaped bottom portion, and the inducer-chopper is operative to extract the used coolant from the bottom portion.

13. A method for recycling coolant for at least one machine tool, comprising the steps of:

operating at least one machine tool with a coolant whereby metal chips are produced in the used coolant;

transferring the used coolant and metal chips to a tank;

extracting used coolant and metal chips from the tank into an inlet portion of a pump having an inducer-chopper in the inlet portion;

chopping the metal chips to effect a reduction in size of the chips by the inducer-chopper positioned in the inlet portion;

supplying the used coolant and size-reduced chips from the pump to a filter for filtering the size-reduced chips from the coolant;

supplying the filtered coolant with the chips removed therefrom back to at least one machine tool.

14. The method of claim 13, wherein the used coolant is transferred to a tank having a substantially conical shaped bottom portion whereby the metal chips settle in the bottom portion, and the used coolant and metal chips are extracted from the bottom portion.

15. The method of claim 13, wherein the used coolant is transferred to a tank having a truncated conical shaped bottom portion whereby the metal chips settle in the bottom portion, and the used coolant and metal chips are extracted from the bottom portion.

16. The method of claim 13, wherein supplying the used coolant and size-reduced chips from the pump to the filter includes spinning the used coolant into a vortex in a circular, concentric cavity above the inlet portion by an impeller positioned above the cavity and forcing the used coolant out a discharge portion of the pump connected to the filter.

* * * * *